United States Patent
Cropper et al.

(10) Patent No.: US 10,606,624 B2
(45) Date of Patent: *Mar. 31, 2020

(54) PLACEMENT OF VIRTUAL MACHINES ON PHYSICAL HOSTS

(71) Applicant: International Business Machines Corporation, Armonk, NY (US)

(72) Inventors: Joseph W. Cropper, Rochester, MN (US); Yong Feng, Markham (CA)

(73) Assignee: International Business Machines Corporation, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 15/814,329

(22) Filed: Nov. 15, 2017

(65) Prior Publication Data

US 2018/0074838 A1    Mar. 15, 2018

Related U.S. Application Data

(63) Continuation of application No. 14/740,891, filed on Jun. 16, 2015, now Pat. No. 9,864,618, which is a (Continued)

(51) Int. Cl.
*G06F 9/455* (2018.01)
*G06F 9/50* (2006.01)
(Continued)

(52) U.S. Cl.
CPC ...... *G06F 9/45533* (2013.01); *G06F 9/45558* (2013.01); *G06F 9/4881* (2013.01);
(Continued)

(58) Field of Classification Search
CPC ............ G06F 9/45533; G06F 9/45558; G06F 9/4881; G06F 9/5077
See application file for complete search history.

(56) References Cited

U.S. PATENT DOCUMENTS

2009/0106409 A1    4/2009   Murata
2013/0263120 A1   10/2013   Patil et al.
(Continued)

OTHER PUBLICATIONS

Sotomayor et al., "An Open Source Solution for Virtual Infrastructure Management in Private and Hybrid Clouds", IEEE Internet Computing, Special Issue on Cloud Computing, Jul. 7, 2009.
(Continued)

*Primary Examiner* — James J Lee
(74) *Attorney, Agent, or Firm* — Martin & Associates, LLC; Bret J. Petersen

(57) ABSTRACT

Placement of virtual machines on physical hosts are based on differing initial policies and optimization policies set by a system administrator to more efficiently utilize system resources and serve the needs of different workloads. A scheduler mechanism allows a system administrator to select different initial placement policies for one or more host groups of physical hosts. The scheduler mechanism utilizes an optimizer that monitors host performance and adjusts the placement of virtual machines according to another set of optimization policies similarly selected by the system administrator for each of the host groups.

17 Claims, 8 Drawing Sheets

Related U.S. Application Data continuation of application No. 14/701,123, filed on Apr. 30, 2015, now Pat. No. 9,823,941.

(51) Int. Cl.
 *G06F 9/48* (2006.01)
 *H04L 12/24* (2006.01)

(52) U.S. Cl.
 CPC ........ *G06F 9/5077* (2013.01); *H04L 41/0806* (2013.01); *H04L 41/0893* (2013.01); *H04L 41/0896* (2013.01); *H04L 41/12* (2013.01); *H04L 41/5025* (2013.01); *G06F 2009/4557* (2013.01); *G06F 2009/45595* (2013.01); *H04L 41/0823* (2013.01); *H04L 41/5096* (2013.01)

(56) References Cited

U.S. PATENT DOCUMENTS

| | | |
|---|---|---|
| 2014/0189684 A1 | 7/2014 | Zaslavsky et al. |
| 2014/0207944 A1 | 7/2014 | Emaru |
| 2015/0006734 A1* | 1/2015 | Parikh .................... H04L 47/70 709/226 |
| 2015/0040129 A1 | 2/2015 | Park et al. |
| 2015/0067677 A1 | 3/2015 | Naseh et al. |
| 2015/0120931 A1 | 4/2015 | Padala et al. |
| 2015/0143366 A1 | 5/2015 | Suragi Math et al. |
| 2015/0261578 A1 | 9/2015 | Greden et al. |
| 2015/0363216 A1 | 12/2015 | Sampathkumar et al. |
| 2016/0147549 A1 | 5/2016 | Sivak et al. |

OTHER PUBLICATIONS

Hyser et al., "Autonomic Virtual Machine Placement in the Data Center", HP Laboratories, Feb. 26, 2008.
Openstack, "Filter Scheduler", nova 2015.1.dev883 documentation, printed Mar. 13, 2015.
Elmroth et al., "Interfaces for Placement, Migration, and Monitoring of Virtual Machines in Federated Clouds", Eighth International Conference on Grid and Cooperative Computing, Aug. 2009.
System Center: Virtual Machine Manager Engineering Blog, Mar. 11, 2013.
VMware, "VMware Distributed Resource Scheduler (DRS)", product datasheet, 2009.
VSphere 6.0—Feature List, Mar. 2, 2015.
Cropper et al., "Placement of Virtual Machines on Physical Hosts" U.S. Appl. No. 14/701,123, filed Apr. 30, 2015.
Cropper et al., "Placement of Virtual Machines on Physical Hosts" U.S. Appl. No. 14/740,891, filed Jun. 16, 2015.
Appendix P—List of IBM Patents or Patent Applications Treated As Related, dated Dec. 1, 2017.

* cited by examiner

PLACEMENT OF VIRTUAL MACHINES ON PHYSICAL HOSTS

BACKGROUND

1. Technical Field

This invention generally relates to virtual machines in a computing environment, and more specifically relates to placement of virtual machines on physical hosts in a computing environment based on differing initial policies and optimization policies.

2. Background Art

Cloud computing is a common expression for distributed computing over a network and can also be used with reference to network-based services such as Infrastructure as a Service (IaaS). IaaS is a cloud based service that provides physical processing resources to run virtual machines (VMs) as a guest for different customers. The virtual machine may host a user application or a server.

A computing environment, such as a cloud computing environment, may have a large number of physical machines that can each host one or more virtual machines. Prior art cloud management tools allow a system administrator to assist in determining a specific physical host in which to place or deploy a new virtual machine. After deployment, the cloud management tools may optimize the system by moving one or more virtual machines to a different physical host. The placement of the new virtual machine initially and during optimization may be determined by a placement policy selected by the system administrator.

BRIEF SUMMARY

An apparatus and method place virtual machines on physical hosts based on differing initial policies and optimization policies set by a system administrator to more efficiently utilize system resources and serve the needs of different workloads. A scheduler mechanism allows a system administrator to select different initial placement policies for one or more host groups of physical hosts. The scheduler mechanism utilizes an optimizer that monitors host performance and adjusts the placement of virtual machines according to another set of optimization policies similarly selected by the system administrator for each of the host groups.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
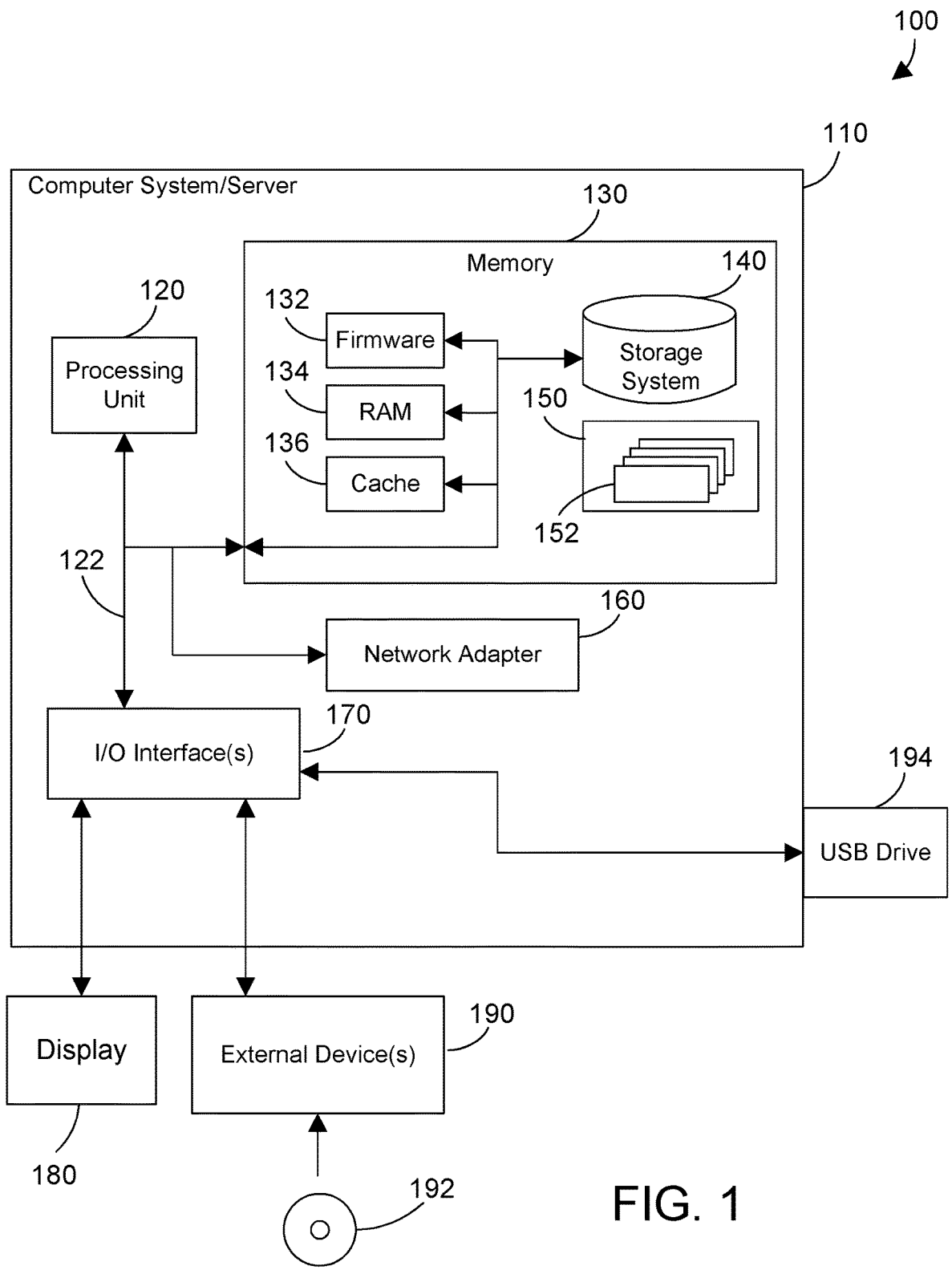
FIG. 1 is a block diagram of a cloud computing node.

The claims and disclosure herein provide mechanisms for placement of virtual machines on physical hosts based on differing initial policies and optimization policies set by a system administrator to more efficiently utilize system resources and serve the needs of different workloads. A scheduler mechanism allows a system administrator to select different initial placement policies for one or more host groups of physical hosts. The scheduler mechanism utilizes an optimizer that monitors host performance and adjusts the placement of virtual machines according to another set of optimization policies similarly selected by the system administrator for each of the host groups.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136.

Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
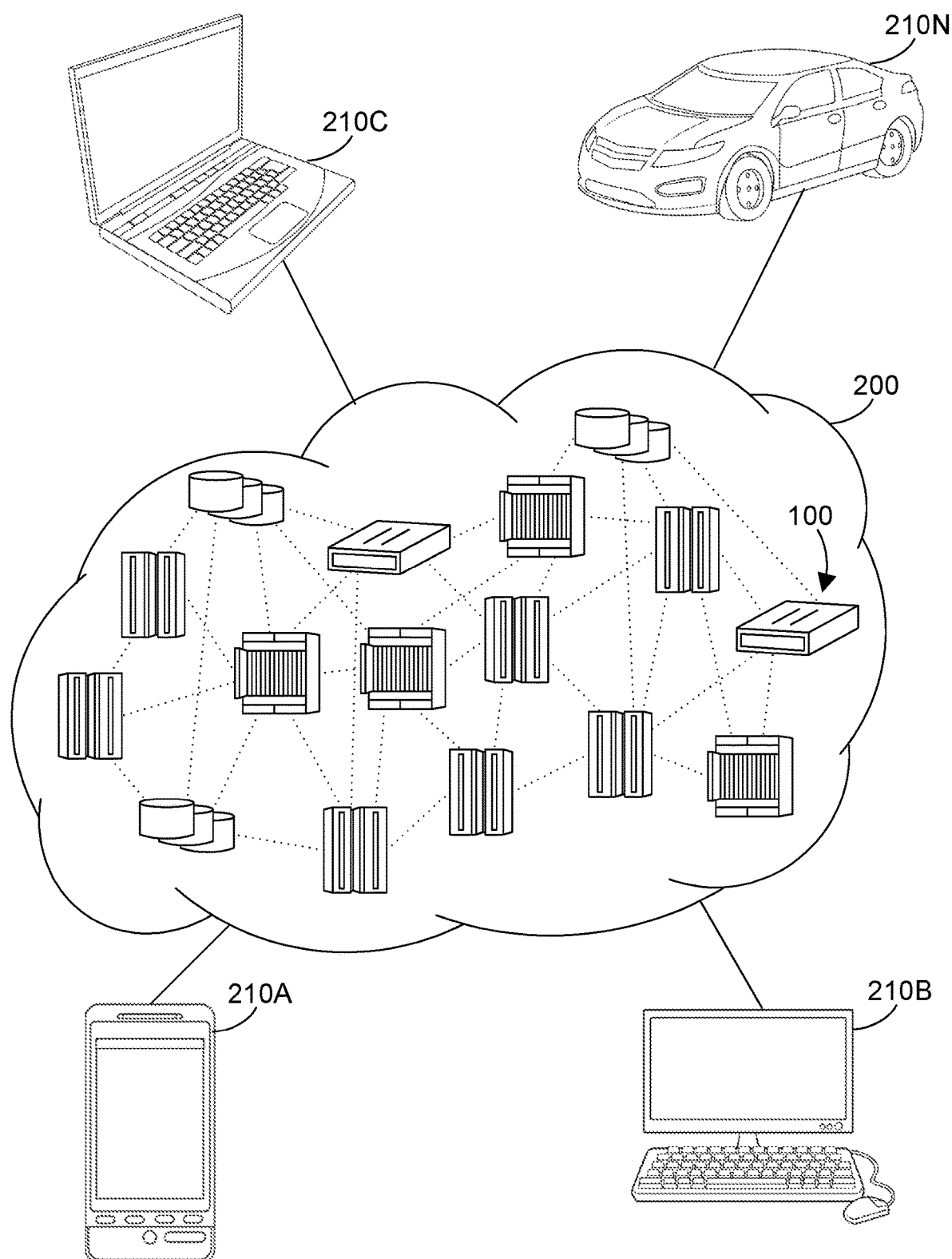
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
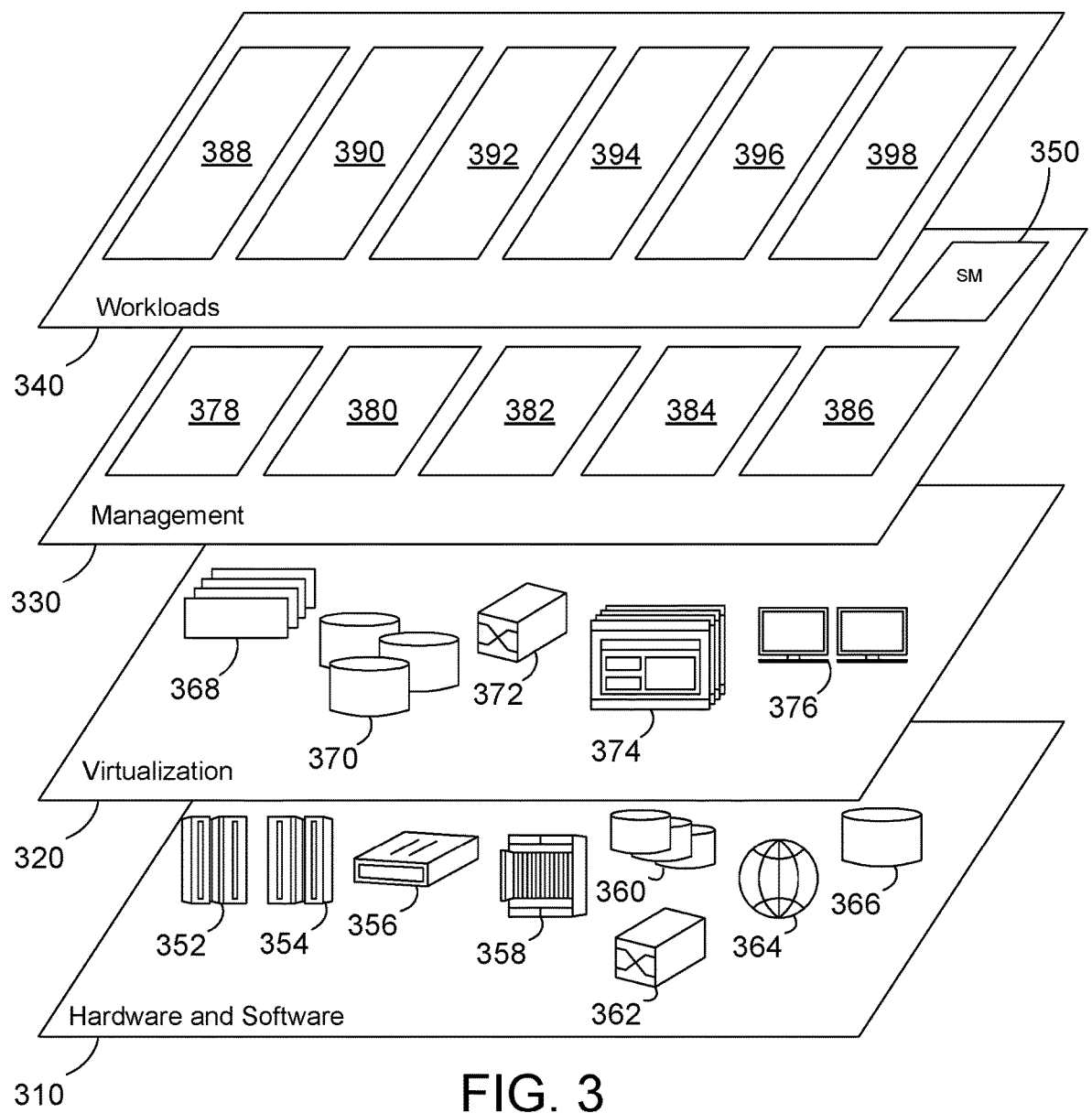
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a scheduler mechanism (SM) 350 as described herein. While the SM 350 is shown in FIG. 3 to reside in the management layer 330, the SM 350 actually may span other levels shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 4:
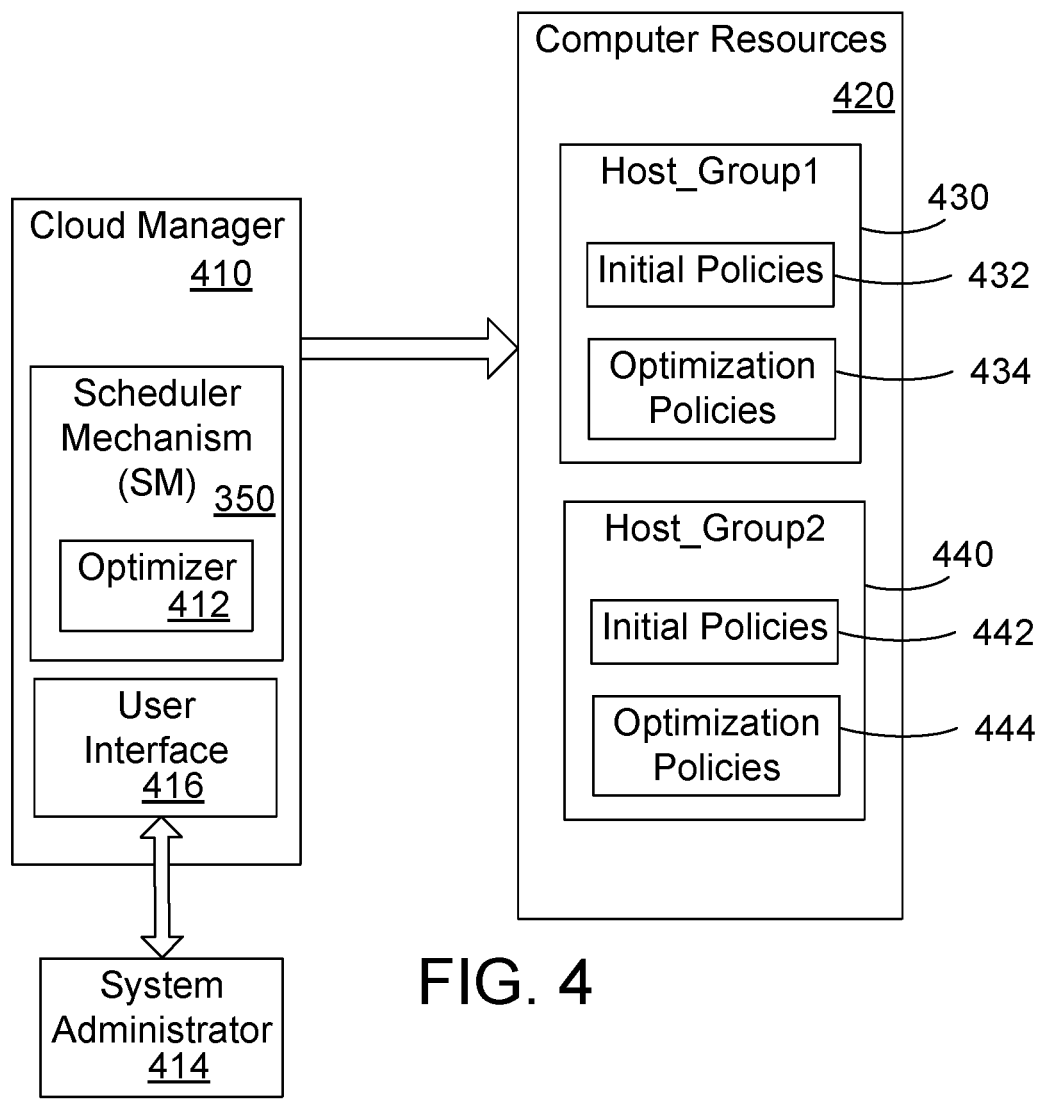
FIG. 4 is a block diagram that illustrates a scheduler mechanism as described herein that provides placement of virtual machines on physical resources based on differing initial policies and optimization policies.

Referring now to FIG. 4, a block diagram illustrates a scheduler mechanism 350 (shown in FIG. 3 and introduced above) that provides placement of virtual machines on physical resources based on differing initial policies and optimization policies. In the illustrated example, the scheduler mechanism 350 is part of a cloud manager 410. The cloud manager 410 may be similar to cloud managers known in the prior art but includes the additional features of the scheduler mechanism 350 as described herein. The cloud manager 410 allows a human user or system administrator 414 to set up and manage computer resources through a user interface 416. The cloud manager 410 implements the cloud management functions 330 described above with reference to FIG. 3. The scheduler mechanism 350 includes an optimizer 412. The optimizer 412 works in conjunction with the scheduler mechanism 350. The optimizer 412 may operate similarly to prior art optimizers except as described herein includes additional features. The optimizer 412 monitors VM and host performance and allows the scheduler mechanism 350 to migrate VMs to other hosts according to policies set by a system administrator. The operation of the scheduler mechanism 350 and the optimizer 412 are described further below.

Referring again to FIG. 4, the cloud manager 410 allows the system administrator to set up and manage hardware computer resources 420. Computer resources 420 represent computer resources such as physical host computer systems in a cloud computing environment. In the illustrated example, the computer resources 420 includes two host groups of computers, host_group1 430 and host_group2 440. A host group is a logical grouping of one or more physical computer hosts (not shown in FIG. 4) of the computer resources managed by the cloud manager 410. The computer resources 420 may include a large number of physical computer hosts arranged into one or more host groups. The physical computer hosts may be located remotely from the cloud manager. A host is a physical computer accessible over a network to the cloud manager. A host has a hypervisor (software) that allows the host to run one or more virtual machines as known in the prior art. Hosts are described further below.

As shown in FIG. 4, host_group1 has initial policies 432 and optimization policies 434. Similarly, host_group2 has initial policies 442 and optimization policies 444. In FIG. 4, the initial policies 432, 442 and optimization policies 434, 444 are shown within their respective host group for illustration purposes. The initial policies 432, 442 and optimization policies 434, 444 are logically associated with the respective host group as shown but may physically reside in memory or a file assessable to the scheduler mechanism 350.

As introduced above, the scheduler mechanism 350 provides placement of virtual machines on physical resources based on differing initial policies and optimization policies set by a system administrator. The initial and optimization policies may be one or a combination of known policies developed in the future. A few of the more common policies are given here as examples of policies that could be utilized by the scheduler mechanism 350 described herein.

Striping—a policy for placing a VM on a host having the fewest number of VMs (i.e., round-robin like placement).

Packing—a policy for placing a VM on a host having the highest number of VMs (e.g., useful to densely pack systems—typically used in non-production environments in which mission critical performance isn't always required).

CPU Allocation Based—a policy for placing a VM on a host having the lowest percentage of its available CPU resources utilized.

Memory Allocation Based—a policy for placing a VM on a host having the lowest percentage of its available memory resources utilized.

CPU Utilization Based—a policy for placing a VM on a host having the lowest average CPU utilization over the past X units of time.

Figure 5:
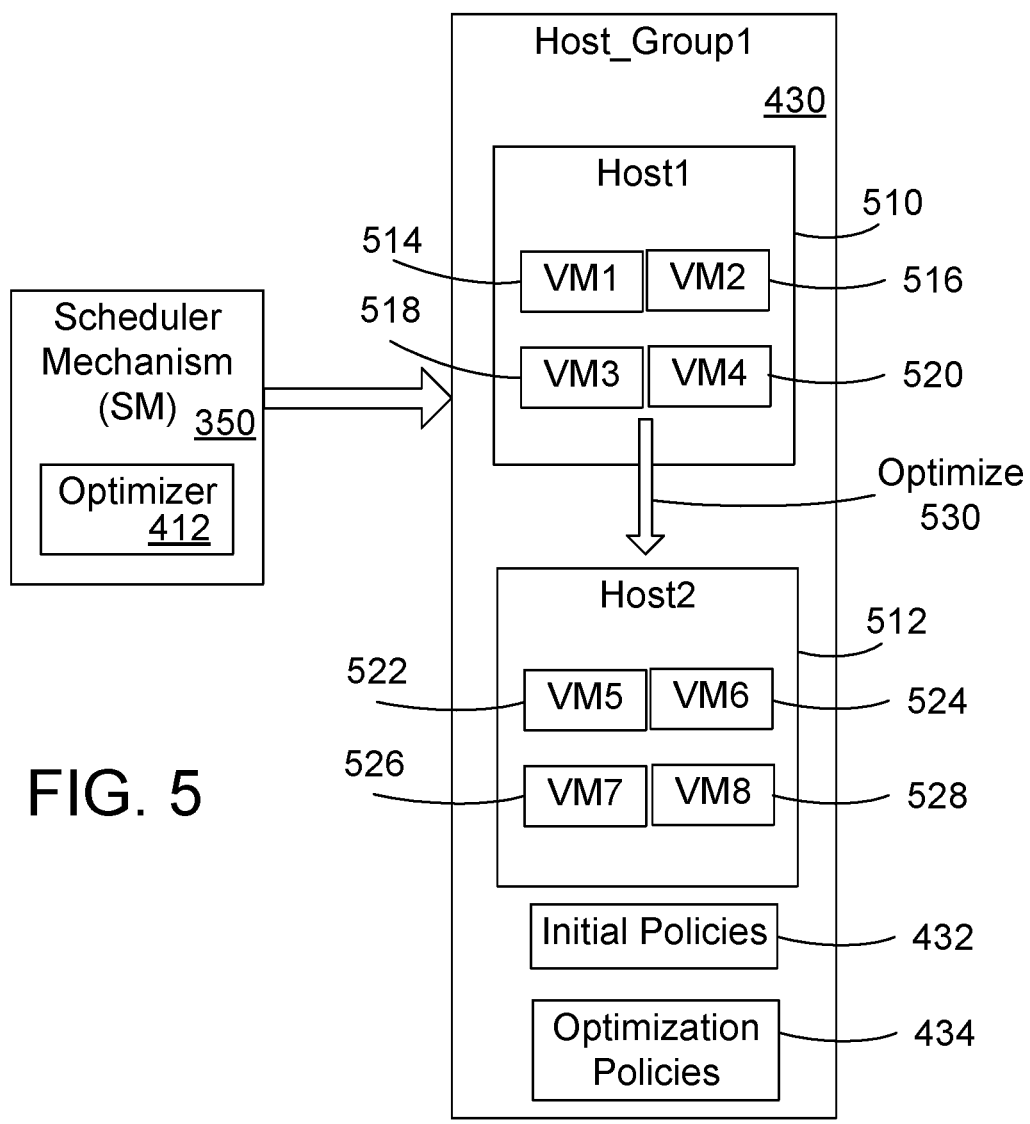
FIG. 5 is a block diagram that illustrates a simplified example of placing virtual machines on host computer resources based on initial policies.
Figure 6:
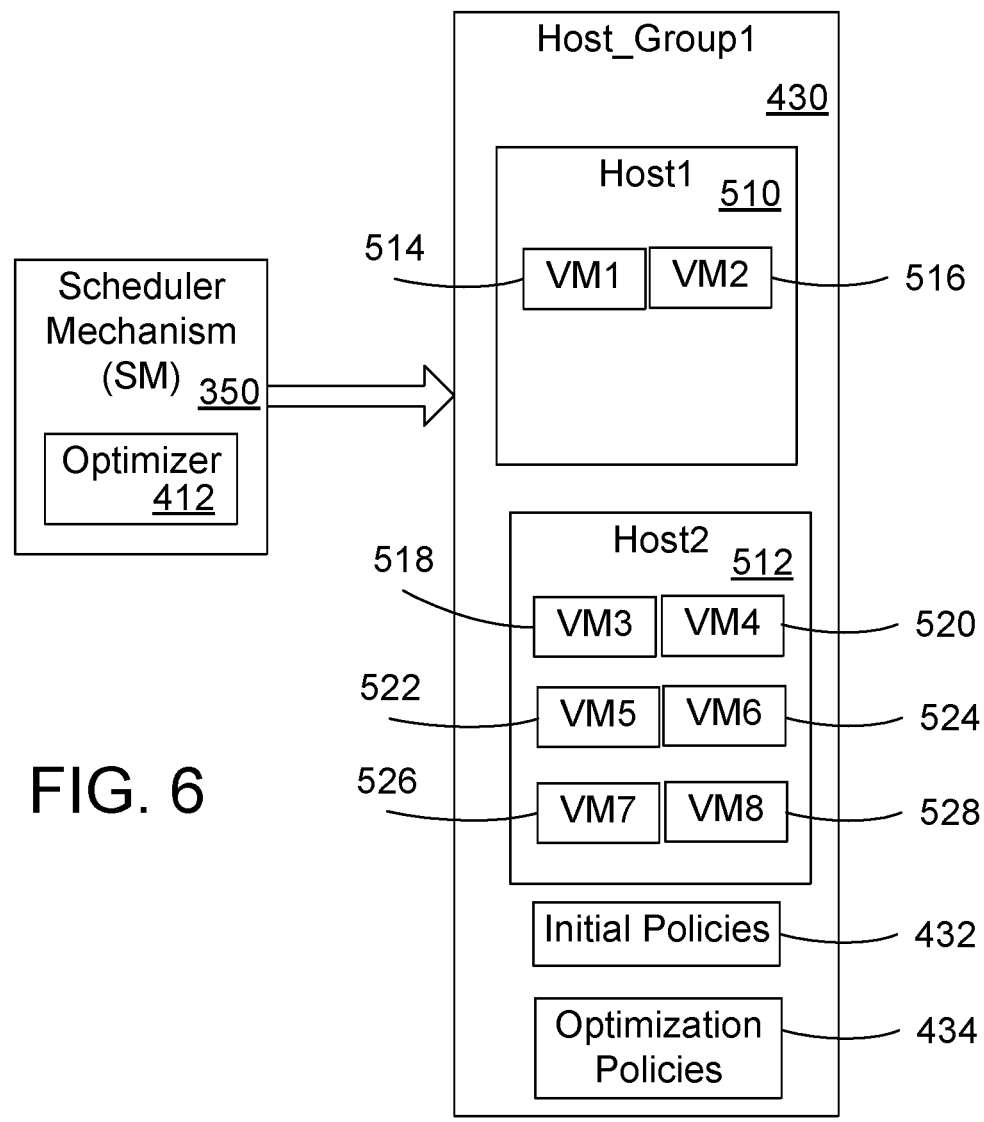
FIG. 6 is a block diagram that illustrates a simplified example of placing virtual machines on host computer resources based on optimization policies.

FIGS. 5 and 6 illustrate an example of placing virtual machines on physical resources as described and claimed herein. In this example, the scheduler mechanism 350 places virtual machines using initial policies 432 and optimization policies 434. As mentioned above, each host group contains one or more physical hosts that can host virtual machines. In the example illustrated in FIG. 5, host_group1 430 has host1 510 and host2 512. Only two hosts are shown in this example for simplicity, but it is understood that an actual host group may contain any number of physical computer hosts. Host_group1 has four virtual machines, VM1 514, VM2 516, VM3 518 and VM4 520. Similarly, host_group2 has four virtual machines VM5 522, VM6 524, VM7 526 and VM8 528. In this example we assume the initial policies 432 for host_group1 includes a striping policy that indicates to the scheduler mechanism 350 to distribute VMs evenly to the hosts. As a result of the striping policy, the virtual machines are placed in the host group with four VMs on each host as shown.

Again referring to FIGS. 5 and 6, after initial placement, the VMs appear as shown with four VMs on each host. The scheduler mechanism in conjunction with the optimizer 412 monitors the host performance in a manner as known in the prior art. The scheduler mechanism uses the optimization policies for host_group1 for optimization of the performance of the host group. If the optimizer determines a host or VM indicates unsatisfactory performance or performance below a threshold according to the optimization policies 434 for host_group1 430, then the optimizer may determine to optimize according to the optimization policies 434 for host_group1. In this example, we assume that one of the optimization policies 434 is an optimization policy to migrate VMs when central processing unit (CPU) capacity of a host exceeds 90%. In the illustrated example, we assume that the optimizer 412 has determined that host 1 410 is performing beyond a threshold. For example, the optimizer 412 may have determined that the CPUs of host1 410 are performing at 98% of capacity. The optimizer then determines that the CPUs of host2 512 are performing below capacity and estimates that excess capacity can handle the increased load of moving additional VMs to host2 512. The scheduler mechanism 350 then optimizes 530 the host group by migrating VM3 518 and VM4 520 to host2 as shown in FIG. 6.

The above example in FIGS. 5 and 6 illustrates an advantage to having different initial placement policies and optimization policies. As in the above example, the initial placement policy can be a simple policy that quickly determines an appropriate host for a virtual machine. During operation, when more information is available, the scheduler mechanism can use a more detailed optimization policy to migrate virtual machines in a more optimized placement to more efficiently utilize system resources and serve the needs of different workloads.

Figure 7:
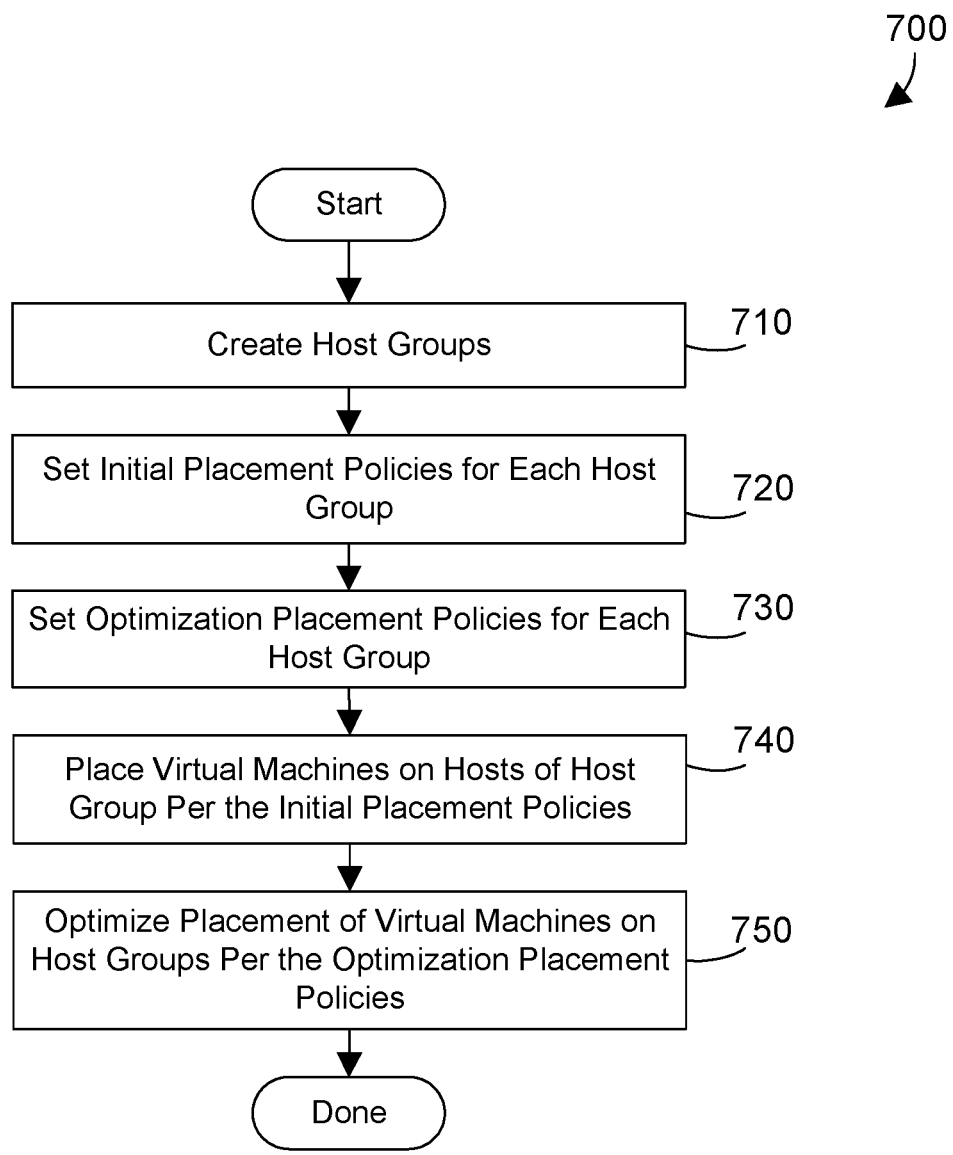
FIG. 7 is a flow diagram of a method for placement of virtual machines on physical resources based on differing initial policies and optimization policies as described herein.

FIG. 7 illustrates a flow diagram of a method 700 for placing virtual machines on physical resources based on differing initial policies and optimization policies. The method 700 is presented as a series of steps performed by a computer software program such as the scheduler mechanism 350 described above. First, create one or more host groups, which can be done by a system administrator using a graphical user interface (step 710). Set initial placement policies for each host group (step 720). Set optimization placement policies for each host group (step 730). Steps 720 and 730 can also be accomplished by allowing a system administrator to select the policies using a graphical user interface. Place virtual machines on hosts per the initial placement policies (step 740). Optimize placement of virtual machines on hosts per the optimization policies set by the administrator for each host group (step 750). The method is then done.

Figure 8:
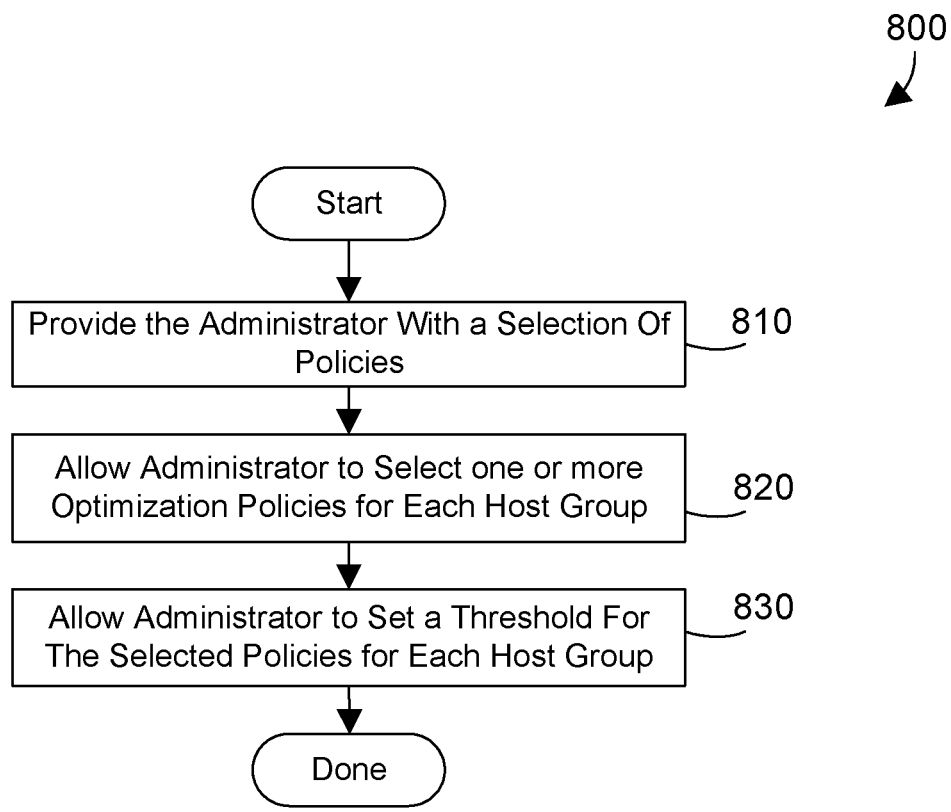
FIG. 8 is a flow diagram of an example method for step 730 in FIG. 7.

Referring now to FIG. 8, a flow diagram shows method 800 that is an exemplary method for performing step 730 in method 700. Step 720 of method 700 could also be accomplished with similar steps as shown here for step 730. The method 800 is presented as a series of steps performed by a computer software program such as the scheduler mechanism 350 described above. First, provide the administrator with a selection of policies (step 810), then allow the administrator to select one or more optimization policies for each host group (step 820). Allow the administrator to set a threshold for the selected policies for each host group (step 830). The method is done.

The claims and disclosure herein provide an apparatus and method for placement of virtual machines on physical resources based on differing initial policies and optimization policies selected by a system administrator to more efficiently utilize system resources and serve the needs of different workloads.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a first host group comprising a plurality of physical host computer systems;
   a first set of policies and a second set of policies for the first host group set by a system administrator that indicates how to place virtual machines on the plurality of physical host computer systems, wherein the first set of policies are initial placement policies that indicate how to initially place virtual machines on the plurality of physical host computer systems, and wherein the second set of policies are optimization placement policies that indicate how to place virtual machines on the plurality of physical host computer systems when optimizing the physical host computer systems;

a first threshold for the initial placement policies and a second threshold for the optimization placement policies;

wherein the initial placement policies are simple policies for quickly determining an initial host for a virtual machine that are distinct from the more detailed optimization placement policies for migrating virtual machines to optimize placement; and a scheduler mechanism residing in the memory and executed by the at least one processor that places virtual machines on the physical host computer systems of the first host group according to the initial placement policies, monitors performance of the physical host computer systems of the first host group, and optimizes placement of the physical host computer systems of the first host group when the performance meets the second threshold of the optimization placement policies by migrating at least one of the virtual machines to a different one of the physical host computer systems.

2. The apparatus of claim 1 further comprising a graphical user interface that allows a system administrator to define the first set of policies and define the second set of policies for the first host group.

3. The apparatus of claim 2 wherein the scheduler mechanism is part of a management layer of a cloud computing environment.

4. The apparatus of claim 1 wherein the physical host computer systems are part of a cloud computing environment.

5. The apparatus of claim 1 wherein the optimization placement policy includes one or more of the following policies:
striping, packing, computer processing unit allocation based, and memory allocation based.

6. The apparatus of claim 1 wherein the scheduler mechanism provides a system administrator with a selection of policies to allow the system administrator to select one or more initial placement policies for the first host group.

7. The apparatus of claim 1 wherein the scheduler mechanism provides a system administrator with a selection of policies to allow the system administrator to select one or more optimization placement policies for the first host group.

8. An apparatus comprising:
at least one processor;
a memory coupled to the at least one processor;
a first host group comprising a plurality of physical host computer systems;
a second host group comprising a plurality of physical host computer systems;
a first set of initial placement policies and a first set of optimization placement policies associated with the first host group that indicates how to place virtual machines on the plurality of physical host computer systems of the first host group;
a second set of initial placement policies and a second set of optimization placement policies associated with the second host group that indicates how to place virtual machines on the plurality of physical host computer systems of the second host group;
wherein the initial placement policies indicate how to initially place virtual machines on the plurality of physical host computer systems, and wherein the optimization policies indicate how to place virtual machines on the plurality of physical host computer systems when optimizing the physical host computer systems;

wherein the initial placement policies are simple policies for quickly determining an initial host for a virtual machine that are distinct from the more detailed optimization placement policies for migrating virtual machines to optimize placement; and a scheduler mechanism residing in the memory and executed by the at least one processor that places virtual machines on the physical host computer systems of the first host group and the second host group according to the corresponding initial placement policies, monitors performance of the physical host computer systems of the first host group and the second host group, and optimizes placement of the first host group and the second host group when the respective performance meets respective threshold of the corresponding optimization placement policies by migrating at least one of the virtual machines to a different one of the physical host computer systems.

9. The apparatus of claim 8 further comprising a graphical user interface that allows a system administrator to define the first set of policies and define the second set of policies for the first host group and the second host group.

10. The apparatus of claim 8 wherein the scheduler mechanism is part of a management layer of a cloud computing environment.

11. The apparatus of claim 8 wherein the physical host computer systems are part of a cloud computing environment.

12. The apparatus of claim 8 wherein the scheduler mechanism further allows a system administrator to set a first threshold for the initial placement policy policies and a second threshold for the optimization placement policies.

13. The apparatus of claim 12 wherein the second threshold for the optimization placement policies are used by the scheduler mechanism in conjunction with an optimizer to migrate a virtual machine to a different physical host to optimize the first host group when the threshold for the optimization placement policies are met.

14. The apparatus of claim 1 wherein the optimization placement policy includes one or more of the following policies:
striping, packing, computer processing unit allocation based, and memory allocation based.

15. The apparatus of claim 8 wherein the scheduler mechanism provides a system administrator with a selection of policies to allow the system administrator to select one or more initial placement policies for the first host group and the second host group.

16. The apparatus of claim 8 wherein the scheduler mechanism provides a system administrator with a selection of policies to allow the system administrator to select one or more optimization placement policies for the first host group and the second host group.

17. An apparatus comprising:
at least one processor;
a memory coupled to the at least one processor;
a first host group comprising a plurality of physical host computer systems;
a second host group comprising a plurality of physical host computer systems;
a first set of initial placement policies and a first set of optimization policies associated with the first host group that indicates how to place virtual machines on the plurality of physical host computer systems of the first host group;
a second set of initial placement policies and a second set of optimization policies associated with the second host group that indicates how to place virtual machines on the plurality of physical host computer systems of the second host group;

wherein the initial placement policies indicate how to initially place virtual machines on the plurality of physical host computer systems, and wherein the optimization policies indicate how to place virtual machines on the plurality of physical host computer systems when optimizing the physical host computer systems;

wherein the initial placement policies are simple policies for quickly determining an initial host for a virtual machine that are distinct from the more detailed optimization placement policies for migrating virtual machines to optimize placement;

a scheduler mechanism residing in the memory and executed by the at least one processor that places virtual machines on the physical host computer systems of the first host group and the second host group according to the corresponding initial placement policies, monitors performance of the physical host computer systems of the first host group and the second host group, and optimizes placement of the first host group and the second host group when the respective performance meets respective threshold of the corresponding optimization placement policies by migrating at least one of the virtual machines to a different one of the physical host computer systems;

wherein the optimization policy includes one or more of the following policies:
striping, packing, computer processing unit allocation based, and memory allocation based; and a graphical user interface that allows a system administrator to define the initial placement policies and define the optimization placement policies; and wherein the scheduler mechanism further allows a system administrator to set a first threshold for the initial placement policies and a second threshold for the optimization placement policies.

* * * * *